US005927537A

United States Patent [19]

Falk et al.

[11] Patent Number: 5,927,537

[45] Date of Patent: Jul. 27, 1999

[54] PRESSURE CONTAINER

[76] Inventors: Ingemar Falk, Tant Gredelins väg, S-451 73 Uddevalla; Tomas Carlsson, Klev, S-450 47 Bovallstrand, both of Sweden

[21] Appl. No.: 09/003,242

[22] Filed: Jan. 6, 1998

Related U.S. Application Data

[63] Continuation of application No. 08/256,115, Aug. 8, 1994, Pat. No. 5,704,512.

[51] Int. Cl.[6] .................... F16J 12/00

[52] U.S. Cl. .................... 220/501; 220/581

[58] Field of Search .................... 220/501, 506, 220/507, 581, 585

[56] References Cited

U.S. PATENT DOCUMENTS

| | | | |
|---|---|---|---|
| 2,802,332 | 8/1957 | Orsino | 220/506 X |
| 3,338,238 | 8/1967 | Warncke | 220/501 X |
| 3,371,488 | 3/1968 | Turner | 220/4.26 X |
| 3,410,340 | 11/1968 | Gat et al. | 220/501 X |
| 5,323,953 | 6/1994 | Adderley et al. | 220/501 X |
| 5,427,268 | 6/1995 | Downing, Jr. et al. | 220/581 |
| 5,564,587 | 10/1996 | Falk et al. | 220/501 |

FOREIGN PATENT DOCUMENTS

| | | |
|---|---|---|
| 0318434 | 5/1989 | European Pat. Off. . |
| 1155566 | 5/1958 | France . |
| 96045 | 3/1898 | Germany . |
| 3125963 | 7/1983 | Germany . |
| 224159 | 1/1969 | Sweden . |
| 9206324 | 4/1992 | WIPO . |

*Primary Examiner*—Steven Pollard
*Attorney, Agent, or Firm*—Dvorak & Orum

[57] ABSTRACT

A pressure vessel made of plastic consists of an intermediate tubular part closed at each end by an integral end wall. The vessel includes an internally centered tubular part interconnected to said intermediate part by radially extending partition walls. The walls form a plurality of interconnected fluid compartments. The internal walls receive and transmit axial forces operating on the end walls into all walls of the vessel.

4 Claims, 5 Drawing Sheets

PRESSURE CONTAINER

This application is a continuation of application Ser. No. 08/256,115, filed Aug. 8, 1994, now U.S. Pat. No. 5,704,512.

The present invention relates to a vessel for a pressurized fluid made of plastic or a similar material comprising an upper end wall and a lower end wall, which end walls are joined together by means of an outer wall connecting the end walls, which vessel comprises two or more intercommunicating compartments divided by internal partition walls extending between the end walls, which compartments are intended to accommodate the fluid, and also with an internal connection inside the vessel between the end walls via a partition wall connection.

The manufacture of pressure vessels of the compressed air tank type or equivalent at the present time involves forming a tube or tube-like compartment with flat or dished end walls. In a design of this kind, as in all pressurized tubes which lack any internal reinforcement in the vessels, the tensile stresses peripherally along a cross-section of the tube section are at least twice as high as the tensile stresses axially in the cross-section.

This means that the material in the tube wall is utilized to less than half its capacity in the axial sense because the design of the construction concentrates the load peripherally. If it were possible to modify the design so as to provide an optimized balance between axial and peripheral stresses, then a material with only half the strength could be used. Alternatively, vessels with half the material content, and thus half the weight, could be made.

The quantities "half" and 50% used in the above description are simplified illustrations. A detailed calculation will produce the actual values for each individual application of the present design.

The technique of reinforcing underground waste pipes and the like internally by the use of partition walls in the longitudinal sense of the pipe is previously disclosed. These partition walls serve only as a support for the outer casing in order to counteract local collapse under external pressure. The partition walls are also able to act as a means of protecting against fracture when lifting long pipes. See SE-B-340.729.

Also previously disclosed, inter alia in SE-C-224.159, is the technique of sectioning the cross-section in a plastic vessel in order to counteract any attempt by the vessel to adopt a circular cross-section in the presence of internal overpressure. At the same time the required thickness of the outer casing can be reduced by executing the compartments closest to the outer casing with a smaller cross-sectional area. A certain saving in weight for a pressure vessel can be achieved in this way. However, the problem remains that certain parts of the material are exposed to higher stress concentrations in one direction. This is particularly true of the joining components where joining takes place by means of dovetail grooves or centre plugs.

In internally sectioned pressure vessels of the previously disclosed kind, the connecting forces between the various parts of the vessel are absorbed by the aforementioned dovetail grooves, rivets, welding or folding of the outer casings.

The present invention permits optimal material use for load absorption because of the internal overpressure in the vessel.

The section through the vessel cross-section is executed as shown in the Figure in order to achieve an even distribution of stresses over the entire cross-section, and not simply low stresses in the outer casing.

The practical function has been demonstrated by pressure-testing parts of the vessel and by detailed calculation according to the finite element method. The tests and the detailed calculations were necessary because the function is contradicted by established methods of calculation which are applied in a generally simplified fashion.

The present invention also makes reference to a method of construction for joining together the parts of the vessel which differs from established methods of construction and calculation.

By joining together not only certain components, but also the sectioned internal cross-section between two parts of the vessel in a fashion which not only seals, but also transmits forces, the stress distribution over the cross-section is also uniform in the axial sense.

The method of construction in accordance with the present invention produces a pressure vessel with higher or optimized identical stresses axially compared with radially in the vessel cross-section. This is unique and differs from previously established calculation practice for pressure vessels.

At the same time unique opportunities are opened up for material use, and thus for weight saving.

The principal object of the present invention is thus, in the first place, to find a design of vessel of the indicated kind enabling the characteristics of the material to be utilized in an optimal fashion in the manufacture of a vessel for a pressurized fluid.

Said object is achieved by means of a vessel of the kind in accordance with the present invention, which is characterized essentially in that said internal partition wall, outer wall and end walls are joined together in such a way that they are essentially gas-tight and capable of transmitting forces in order to form a unit, so that any axial forces which may arise because of internal overpressure in the vessel acting against the end walls are absorbed by at least the major proportion of the cross-section of the vessel comprising the outer wall and the partition wall.

A further object of the present invention is to find a method capable of being applied effectively and reliably in order to produce pressure vessels of the kind intended in accordance with the invention.

Said further object is achieved by a method in accordance with the present invention, which is characterized essentially in that joining together of two or more separately manufactured component parts of the vessel is achieved preferably by welding, fusing, rotation welding, ultrasonic welding, laser welding, vibration, locking together by mechanical means or adhesive bonding, or through a combination of a number of said methods of joining.

A final object of the present invention is to find an application for vessels of the kind intended in accordance with the invention.

Said final object is achieved through an application in accordance with the invention, which is characterized essentially in that the vessel is used in the form of a liquefied petroleum gas vessel, a compressed air tank or a fire extinguisher to accommodate a pressurized fluid contained therein.

The present invention makes use of the aforementioned advantages associated with a tube divided into compartments, although above all else it makes available a method of construction in which the distribution of forces in a vessel divided into compartments is utilized in a manner not previously disclosed.

The load distribution over the cross-section can be optimized by designing the internally reinforced vessel in an appropriate fashion, for example as two concentric tubes with interjacent reinforcing rings of the spoked type in the cross-section.

This means that the resulting forces due to the internal overpressure acting against the end walls of the vessel can be taken as the dimensioning value for the construction.

Or, to express it another way: a cross-section with a smaller material content can be used by utilizing the internal reinforcements in the vessel not only as a means of reinforcing the form, but also for optimizing the distribution of forces in the cross-section of the vessel. The point is thus reached at which the axial stresses generated by the pressure on the end pieces becomes the norm for the internal overpressure which the vessel can withstand.

By joining together vessel components or tubes with end pieces in the manner indicated in the Patent claims, so that the whole or the major proportion of the cross-section with its sub-division into compartments is connected together in such a way that it is suitable for transmitting any axial forces which may arise due to the overpressure inside the vessel acting against the end walls in the form of tensile stress from one end of the vessel to the other, a vessel is obtained in which optimal advantage can be taken of the strength characteristics of the material.

The possibilities afforded by this method of construction permit the manufacture of vessels with a lower own weight and the use of materials with lower strength characteristics, at the same time retaining the functional user benefits of heavier vessels made of higher-strength materials.

Various conceivable illustrative embodiments of how the invention may be applied to the design of the vessel are described below.

The practical design of the construction in accordance with the invention can be executed inter alia in one or other of the ways described in the illustrative embodiments shown below.

The factor which determines the function enabling the advantages of the invention to be utilized is that the joining between the different parts of a vessel must be executed in such a way that joining takes place over a major proportion of the cross-section, and that the joint is made in such a way that it is capable of transmitting tensile stresses between the different parts of the vessel, including when the tube section divided into compartments is subjected to elastic enlargement in order to achieve optimal stress distribution in the cross-section.

Joining can be performed, for example, by the rotation welding of different parts one to the other, for example joining a flat base plate to a tube divided into compartments with an integrated end plate termination at the opposite end.

A second applicable method involves the use of laser welding or some other method of welding, which is capable of welding inside enclosed compartments, to weld together two vessel components which are divided into compartments with mating cross-sections, so that the whole or a major proportion of the cross-sections are joined to one another.

A further way in which the advantages of the invention can be utilized in the construction involves the introduction of plugs having the same form as the compartments into the open end of a vessel divided into compartments. The plugs can be separate from one another or can be formed as a connected component in accordance with the illustrative embodiment indicated below. The sides of the plugs are welded by fusion welding, friction welding or chemical welding, or are adhesive-bonded along the whole or the major proportion of their contact surfaces to the respective internal walls of the various compartments of the vessel, or else some other suitable method of fastening is used for this purpose, which permits the closure to be connected to the vessel in the manner indicated above, for example by fusion, rotation, vibration or locking by mechanical means, or by a combination of the aforementioned methods of joining.

The foregoing description read in conjunction with the following illustrative embodiment shows that pressure vessels can now be produced with a use of materials not previously possible with the help of previously disclosed, tried and tested methods of manufacture, thanks to the construction design of the present invention described here.

The long-desired possibility of producing pressure vessels with a distinctly lower own weight than the solutions which exist today is thus provided by the invention. The significance of this is emphasized all the more in view of the increasing number of pressure vessels which are being incorporated into some form of transport system, where the transported weight is directly associated with a cost.

The invention is described in greater detail below with reference to the accompanying drawings, in which.

Figure 6:
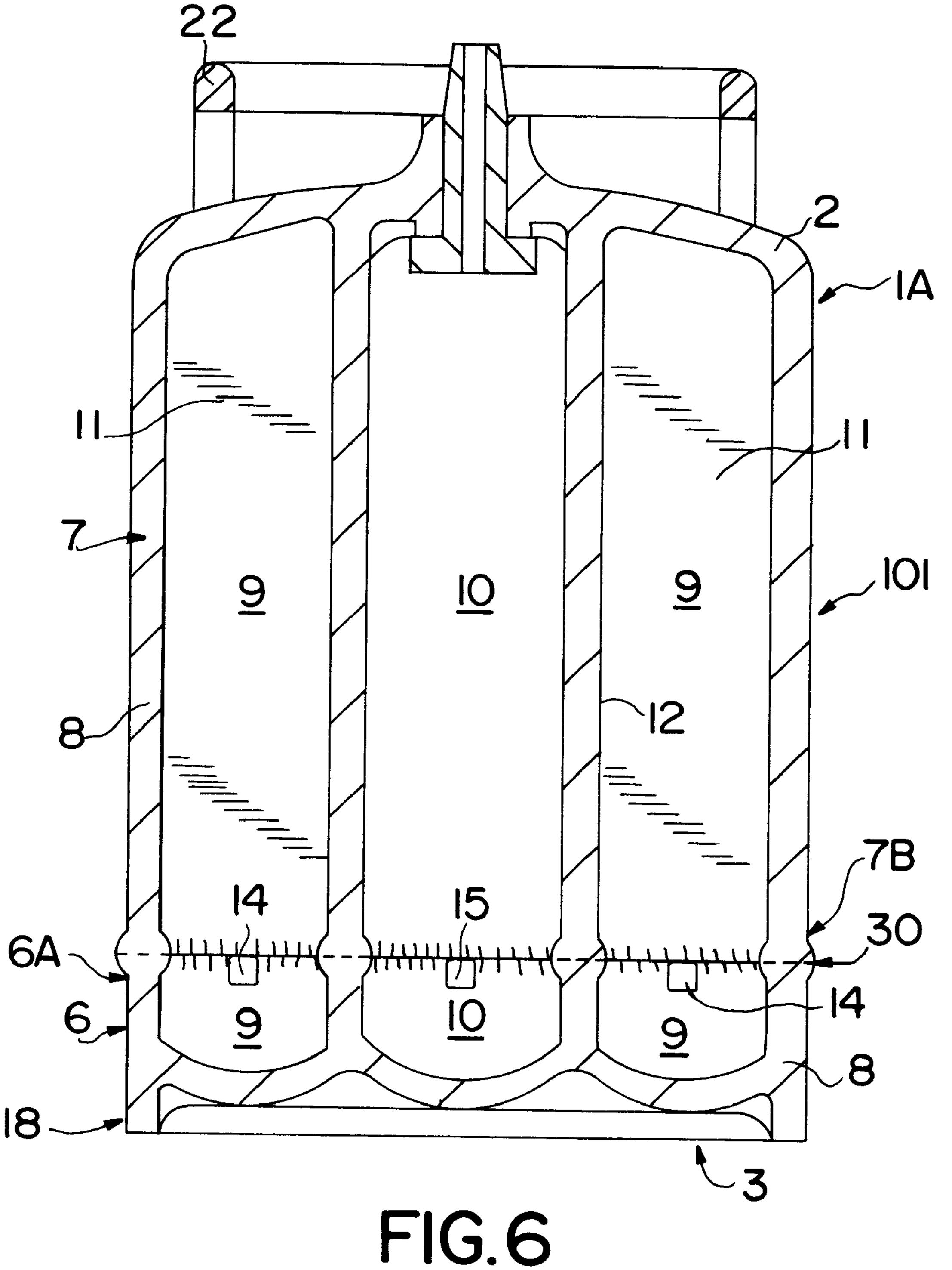
FIG. 6 shows a sectioned view of a vessel variant in accordance with the present invention.
Figure 6A:
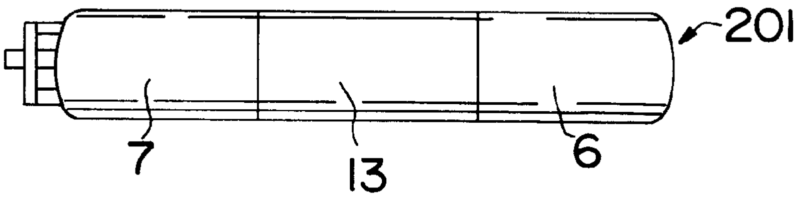
Figure 6B:
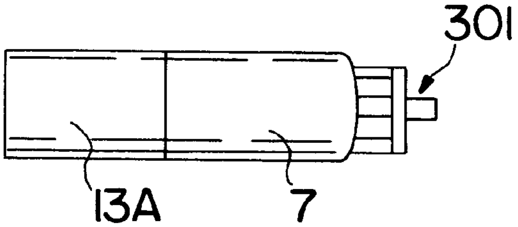
Figure 6C:
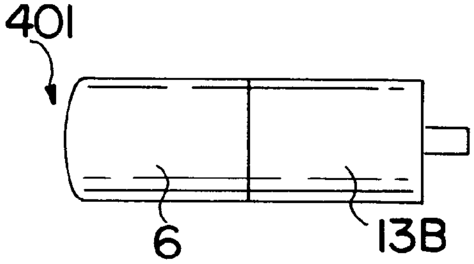

FIGS. 6A—6C show sectioned views of variants of vessels; and

Figure 7:
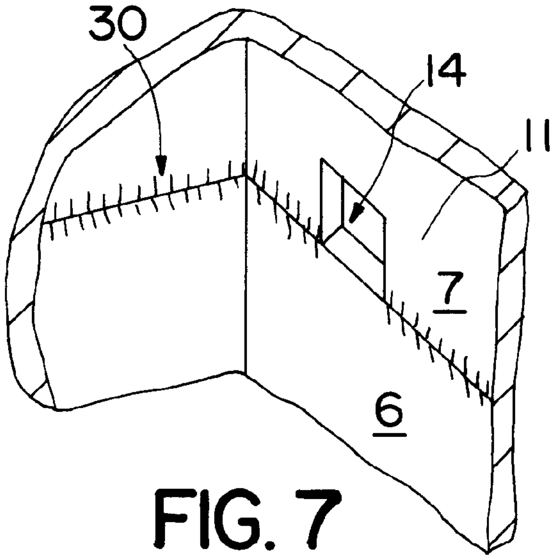

FIG. 7 shows a view of a variant of a connecting opening.

In accordance with the invention a vessel for a pressurized fluid made of plastic or a similar material comprising an upper end wall and a lower end wall, which end walls are joined together by means of an outer wall connecting the end walls, which vessel comprises two or more intercommunicating compartments divided by internal partition walls extending between the end walls, which compartments are intended to accommodate the fluid, and also with an internal connection inside the vessel between the end walls via a partition wall connection, is so arranged that said internal partition wall, outer wall and end walls are joined together in such a way that they are essentially gas-tight and capable of transmitting forces in order to form a unit, so that any axial forces which may arise because of internal overpressure in the vessel acting against the end walls are absorbed by at least the major proportion of the cross-section of the vessel comprising the outer wall and the partition wall.

The vessel may be such that a tubular part extending centrally between the end walls is surrounded by a number of peripheral compartments formed with the help of partition walls extending preferably radially, which partition walls are attached to one another in a gas-tight fashion and extend between the outer wall and the peripheral wall of the tubular part.

The vessel may be such that a connecting opening is arranged in said partition wall and/or end wall of the vessel in order to permit distribution of pressurized fluid between internal fluid-accommodating compartments in the vessel.

The vessel may be such that it is formed from a tubular vessel part provided with an integrated end wall and a further vessel part joined to the open end of said vessel part.

The vessel may be such that the tubular vessel part, which includes an integrated end wall termination, is joined to a vessel end wall.

The vessel may be such that a tubular vessel part, for example, which includes an integrated end wall termination and internal longitudinal reinforcement, is joined at its open end facing away from said integrated end wall to the vessel end wall or to another mating vessel part provided with internal longitudinal reinforcement.

The vessel may be either such that a vessel is formed from, for example, two tubular vessel parts, which include an integrated end wall termination and internal longitudinal reinforcement and are joined together end to-end, or such that, for example, two tubular vessel parts, which include internal longitudinal reinforcement, are joined to one another, and similarly along the major proportion of their parts which match one another, via an intermediate connecting component provided with internal longitudinal reinforcement.

The vessel may be such that the intermediate connecting component is formed by a disc with passages extending axially through the disc, which passages, when in the connected position, join together the internal compartments of connected vessel parts.

The vessel may be such that one of the end walls is formed by mutually separate or connected sealing plugs, which are capable of being contained fully or partially in fluid-accommodating compartments formed between the reinforcing walls and the outer casing of the vessel part.

The vessel may be such that one end wall is formed by a fluid-tight disc, to one side of which a vessel part of the aforementioned kind is joined.

The vessel may be such that the end wall is joined by its peripheral surface to the internal surface of the casing of the vessel part.

The vessel may be such that one end wall has a number of fluid-accommodating compartments, the boundary walls of which, in the joining plane with the other vessel part, have a cross-section which coincides fully or largely with the corresponding section of the aforementioned vessel part.

The vessel may be such that the vessel exhibits one or more external connecting openings inserted from inside the vessel, each of which openings is in connection with the entire internal volume of the vessel or parts of it intended for that purpose.

The vessel may be such that it consists of a thermoplastic, such as polyacetal, polyethylene-terephthalate or a similar plastic material.

The vessel may be such that it exhibits essentially circular cross-sectional form and a largely identical cross-section in the joining plane.

The vessel may be such that it is so arranged as to withstand at least an internal pressure of approximately 9 atmospheres.

What is intended in accordance with the invention is a method for the manufacture of a vessel for a pressurized fluid made of plastic or a similar material and comprising an upper end wall and a lower end wall, which end walls are joined together by means of an outer wall connecting the end walls, which vessel comprises two or more intercommunicating compartments divided by internal partition walls extending between the end walls, which compartments are intended to accommodate the fluid, and also with an internal connection inside the vessel between the end walls via a partition wall connection, and characterized in that the joining together of two or more separately manufactured component parts of the vessel is achieved preferably by welding, fusing, rotation welding, ultrasonic welding, laser welding, vibration, locking together by mechanical means or adhesive bonding, or through a combination of a number of said methods of joining.

The method may be such that the vessel is made from a plastic material by injection moulding, blow moulding, casting or a similar process.

The method may be such that a first vessel part formed from an end wall, an outer wall and a partition wall is joined to a second vessel part.

The method may be such that a said first vessel part is joined to a second vessel part, which is also produced in a single piece comprising an end wall, an outer wall and a partition wall.

The method may be such that a first vessel part is joined to a second vessel part consisting of a whole disc.

The method may be such that a first vessel part is joined to a second vessel part formed from mutually separate or connected plugs or discs, etc., which are attached to the end of the first part so that axial forces arising because of the internal pressure against said plugs are distributed over the whole of the cross-sectional profile of the intermediate part.

The method may be such that a first vessel part is joined to an intermediate part consisting of an outer wall with a partition wall integrated in it.

The method may be such that a valve extending through the wall of the vessel is installed in a hole, preferably a valve attachment made of metal.

The method may be such that the dimensions of the various vessel parts, at least those parts which mate with one another at the joining point in question, and the position of the partition wall in the respective vessel part, are executed so as to be essentially identical with one another.

In accordance with the invention the use of the vessel in the form of a liquefied petroleum gas vessel, a compressed air tank or a fire extinguisher to accommodate a pressurized fluid contained therein is facilitated.

A vessel 1; 101; 201; 301; 401 of the kind intended in accordance with the present invention, which is provided with upper and lower end walls 2 and 3, 4, 5 arranged at mutually opposite ends 1A, 1B of the vessel 1, consists of at least one lower part 6 or upper part 7, which is provided with an end wall 2, 3 integrated with its, for example tubular, casing 8 functioning as an outer wall. The vessel casing 8 is itself subdivided into a number of longitudinal compartments 9 extending in a straight and/or inclined fashion along the central axis C of the intended vessel. A number of compartments 9 distributed peripherally in an annular fashion can thus be so arranged as to enclose at least one centrally situated central compartment 10, for example as shown in the drawings.

A vessel may consist both of a lower part 6 and an upper part 7, for example as shown in FIG. 6, each of which exhibits an end wall 3, 2 integrated with its respective casing 8. Said vessel parts 6, 7 are connected to one another, for example by adhesive bonding, welding such as ultrasonic, vibration or laser welding, for example, so that the major proportion of both the radial and the peripheral walls 11 and 12, which are subdivided into compartments 9, 10 for accommodating a pressurized fluid, are joined to one another, when viewed along the central axis C of the vessel.

A casing subdivided into compartments may be joined to a lower part 6 and/or an upper part 7 of the kind in question for the purpose of forming an extension of the vessel 1, either as a centrally situated vessel part 13, for example as shown in FIG. 6A, or as an end extended vessel part 13A, 13B, for example as shown in FIGS. 6B and 6C.

Communication internally within the vessel 1 is freely permitted between the various internal longitudinal compartments 9–10 intended to accommodate fluid, for example via connecting openings 14, 15 which extend through the compartment walls 11, 12 in question and/or through an integrated end wall 2, 3 or an attachable end wall 4, 5, for example peripherally or radially.

A separate end wall 4, 5 capable of being attached to the casing 8 of a vessel may be executed in various ways. For example, an end wall 5 may be formed from a number of so-called peripheral closures 16, which can be uniformly distributed around a centrally situated closure 17. The external form of the respective closure 16–17 is essentially congruent with the internal peripheral form of the compartments 9–10, i.e. the closures 16–17 are adapted with regard to their form and exhibit a complementary form to that of the corresponding fluid-accommodating compartments 9–10.

An end wall of this kind can also be formed from a number of separate closures, which may be arranged separately from one another and without any connections between them.

Said compartment closures 16–17 can also be connected to one another, for example by means of connecting tongues 18, 19, which extend peripherally between the outer closures 16, like a bracelet, and radially between said outer closures 16 and the central closure 17, in conjunction with which no connection to the central closure 17 is necessary for each outer closure 16.

The attachment of a separate end wall 4, 5 of this kind can also take place in accordance with the method described above, whereby pairs of vessel parts 6, 7 are connected together, for example, with an intermediate connecting part 13 which may be present, for example by adhesive bonding, welding such as ultrasonic, vibration or laser welding, for example, or by some other appropriate method.

Said connecting openings 14, 15 extend through walls 11, 12 capable of attachment as end walls at the end 6A, 7B intended to act as the closure of the compartment in the intended part(s) 6, 7. For example, said openings may extend through a number of radial connecting walls 11 and through a central compartment wall 12.

Figure 2:
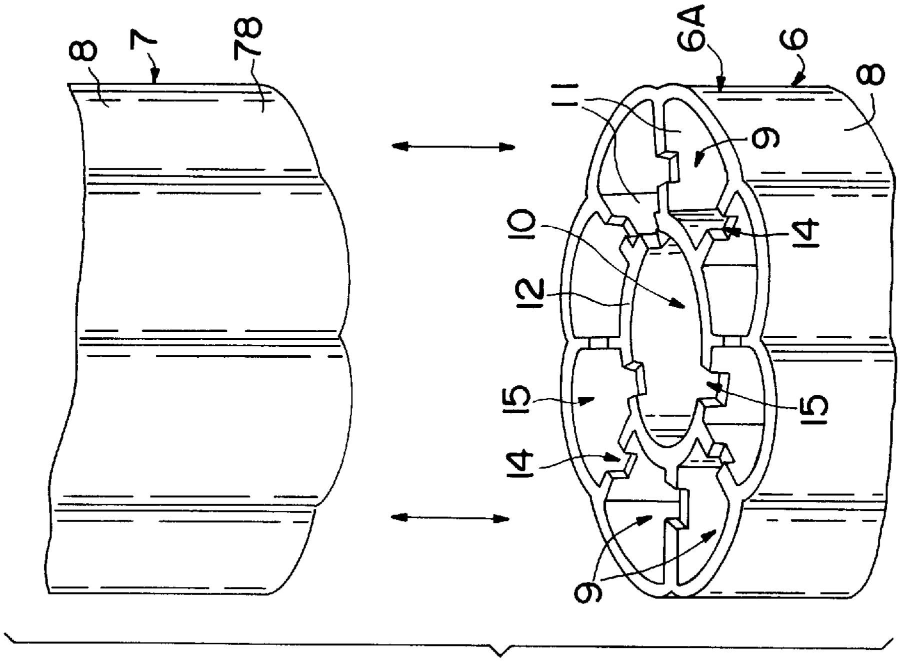
FIG. 2 shows the ends of two connectable vessel components.
Figure 1:
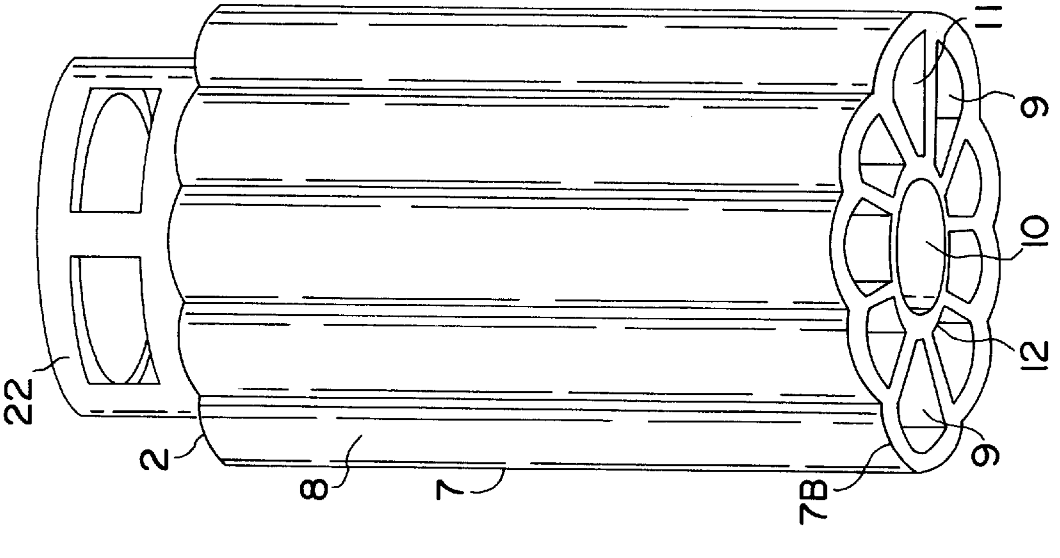
FIG. 1 shows a perspective view of the upper part of a vessel viewed at an angle from below.
Figure 3:
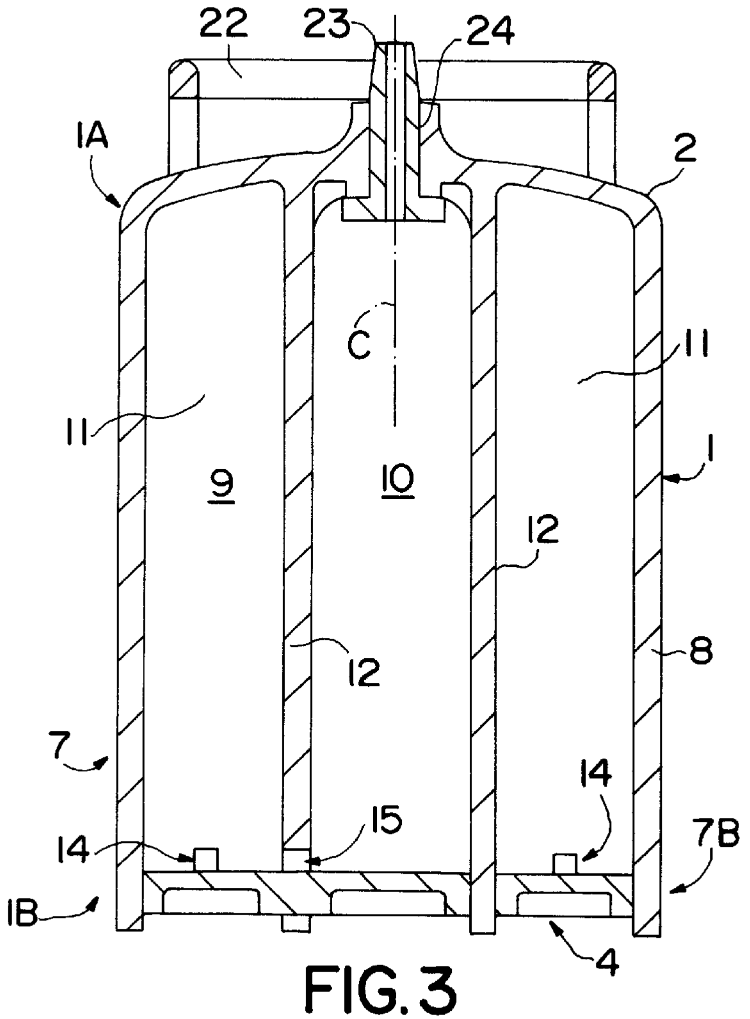
FIG. 3 shows a sectioned view of a vessel in accordance with the present invention.
Figure 4:
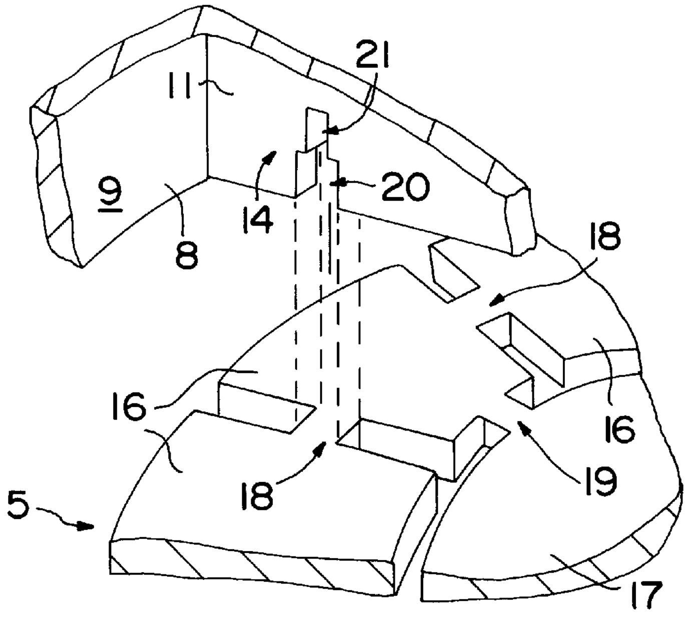
FIG. 4 shows a partial view of the connection between the vessel component and the end wall and a connecting opening of the kind intended.
Figure 5:
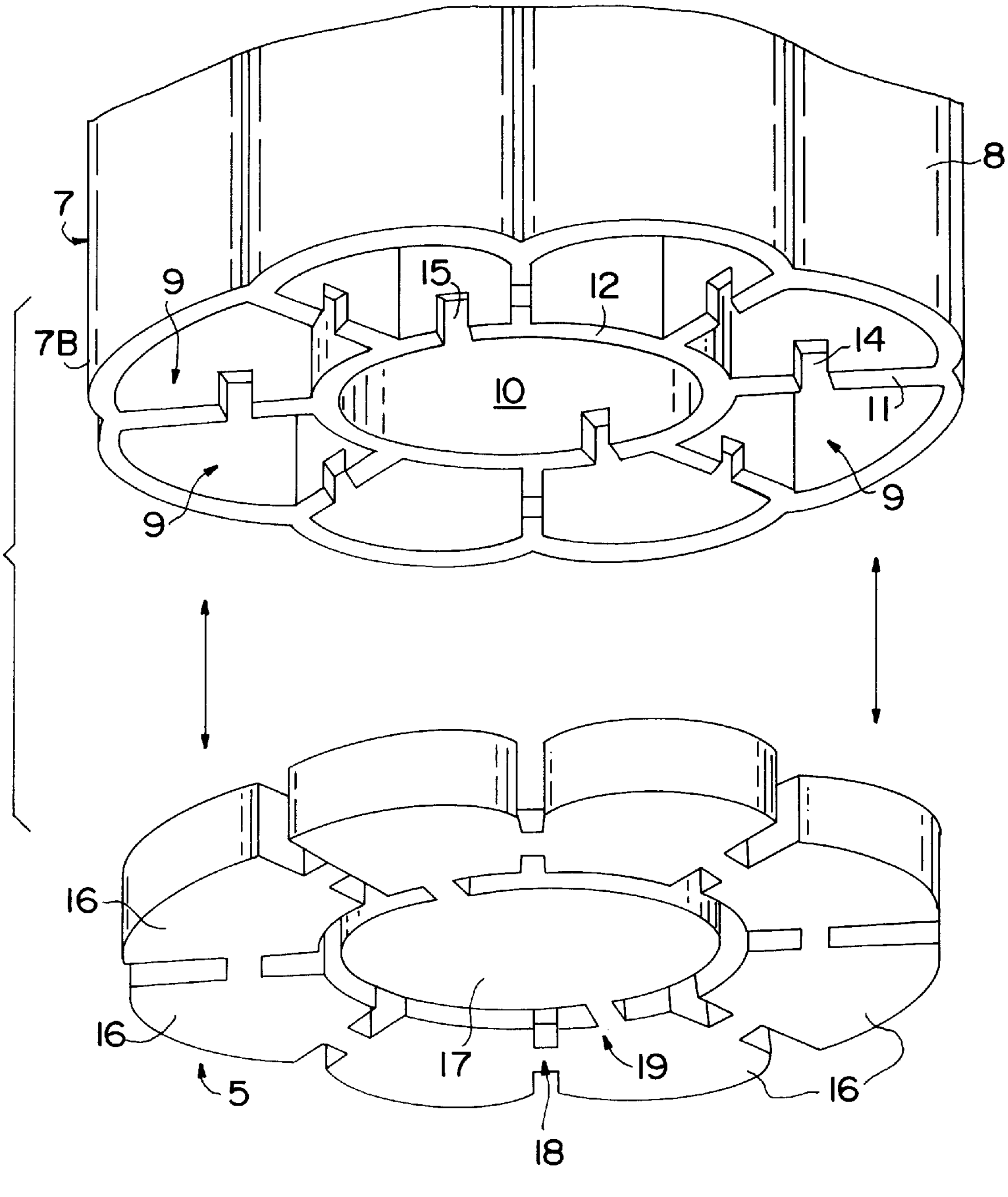
FIG. 5 shows a diagrammatic view of one end of a vessel with a connectable end wall prior to assembly.

For the purpose of connecting together a separate end wall 5, for example of the kind illustrated in accordance with FIGS. 4 and 5, said openings 14, 15 may be of a kind such that they expand in the direction of their open end, in which case, as the openings 14, 15 are moved down relative to the end wall 5, an outer attachment part 20 having a form adapted to the end wall connecting tongues 18, 19 at each opening 14, 15 straddles each of said tongues 18, 19 to which it relates. The end wall 5 is retained internally in the vessel part in this way, at the same time as a passage between said internal compartments 9 in the formed vessel is permitted via the upper narrower part 21, which forms said openings 14, 15.

The openings 14, 15 shown in FIG. 6 can be formed by openings 14, 15 extending through compartment walls 11, 12, which openings remain in essentially unchanged form after the compression and joining together of the ends 6A, 7B of the parts.

A so-called joint intermediate part can also be used, if necessary, which can be formed from a ring with a matching space to accommodate the walls of the respective joined part from the mutually opposing ends of said part.

It is thus possible to produce a vessel which can be manufactured with advantage from a plastic material or some other suitable material, preferably by injection moulding, casting or some other similar method.

A vessel divided into compartments formed from a lower part 6 with an integrated base 3, as shown in FIG. 6, can be attached in accordance with the invention to a corresponding upper part 7, so that the major proportion of the compartment walls 8, 11, 12 of the vessel are permanently attached to the upper part by joining together to form a joint 30 along essentially the entire width for which said walls extend between the parts, which is required in order to be able to withstand high pressures, and in order to permit creep deformations to occur uniformly within the construction and not to give rise to local so-called point deformations with the associated risk of leakage.

If said compartment walls 8, 11, 12, or at least a part thereof, are not joined to one another in an axial sense running along the intended vessel 1, the vessel will not be able to withstand anything other than quite low pressure.

The areas of application for a vessel 1 of the kind in accordance with the invention may be said to be practically unlimited. Mention may be made, for example, of liquids and gases of various kinds, such as liquefied petroleum gas, compressed air and fire-fighting materials, etc.

In order to facilitate handling of the vessel 1, a handle 22 may be arranged at one end 1A of the vessel.

At least one valve 23 in the vessel 1 to permit filling of the vessel and the removal of fluid from the vessel 1 respectively may be formed, for example, by a complete, for example externally threaded part, which is appropriately introduced from the lower end 7B of the vessel part 7 before it is closed off by the end wall 4, into a matching, for example threaded, hole 24 in the upper integrated end wall 2 of the vessel part, and is screwed together with it. Outer connecting openings in the vessel may also be reinforced and/or may be in the form of sleeves, etc., made of a material which differs from the other material used in the vessel, which openings can be fitted in holes intended for that purpose before, in conjunction with or after joining together of the vessel.

The invention is not restricted to the illustrative embodiments described above and illustrated ion the drawings, but may be varied within the scope of the Patent claims without departing from the idea of invention.

We claim:

1. A pressure vessel for receiving pressurized fluids therein, said vessel having a vertical central axis and a radial axis normal to said central axis, comprising:

a first and outermost casing having integrally connected upper and lower end walls which form a first sealed compartment;

a second and hollow tubular part received inside said first casing, said tubular part integrally connected between said same upper and lower end walls so as to form a second sealed compartment disposed centrally of said central axis;

a plurality of equally spaced, radially extending partition walls interconnecting between and integral with said casing, said tubular part, and said upper and lower end walls, said partition walls defining a plurality of adjacent fluid compartments within said first compartment, said integrally formed partition walls structurally tying all vessel walls together so as to form a unitary structural unit, wherein each of said partition walls has respective upper and lower openings therein, each of said openings disposed in a same location wherein said respective upper and lower end walls delimit said respective opening in each partition wall, said upper and lower openings creating fluid communication between all of said adjacent fluid compartments, every other of said adjacent fluid compartments including a radially oriented opening in said tubular part which forms that respective fluid compartment, each of said radial openings disposed in a same location wherein said respective upper and lower end walls delimit said respective opening in each tubular part, said radial openings creating fluid communication between each of said fluid compartments and said second compartment, whereby fluid pressure within said vessel is radially and axially distributed in an equal manner within said casing, tubular part, and end walls, owing to said formation of said unitary structural unit.

2. The pressure vessel of claim 1 wherein said outermost casing is generally cylindrical.

3. The pressure vessel of claim 1 wherein said outermost casing is a spherically-shaped cylinder.

4. The pressure vessel of claim 1, wherein said outermost casing is formed by a continuous series of arcuately-shaped segments.

* * * * *